United States Patent
Zhang et al.

(10) Patent No.: US 12,321,478 B2
(45) Date of Patent: Jun. 3, 2025

(54) UTILITY OPTIMIZED DIFFERENTIAL PRIVACY SYSTEM

(71) Applicant: Telefonaktiebolaget LM Ericsson (publ), Stockholm (SE)

(72) Inventors: Mengyuan Zhang, Hong Kong SAR (CN); Yosr Jarraya, Montreal (CA); Makan Pourzandi, Montreal (CA); Meisam Mohammady, Montreal (CA); Shangyu Xie, Chicago, IL (US); Yuan Hong, Chicago, IL (US); Lingyu Wang, Montreal (CA); Mourad Debbabi, Dollard des Ormeaux (CA)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 549 days.

(21) Appl. No.: 17/610,795

(22) PCT Filed: May 13, 2020

(86) PCT No.: PCT/IB2020/054541
§ 371 (c)(1),
(2) Date: Nov. 12, 2021

(87) PCT Pub. No.: WO2020/230061
PCT Pub. Date: Nov. 19, 2020

(65) Prior Publication Data
US 2022/0215116 A1 Jul. 7, 2022

Related U.S. Application Data

(60) Provisional application No. 62/847,624, filed on May 14, 2019.

(51) Int. Cl.
*G06F 21/62* (2013.01)

(52) U.S. Cl.
CPC ............... *G06F 21/6227* (2013.01)

(58) Field of Classification Search
CPC .................................. G06F 21/6227
See application file for complete search history.

(56) References Cited

U.S. PATENT DOCUMENTS 11,170,131 B1* 11/2021 Rogers ............... G06F 16/9035
2011/0197255 A1* 8/2011 DiCrescenzo ......... H04L 63/10
726/1

(Continued)

FOREIGN PATENT DOCUMENTS

| EP | 3051439 A1 * | 8/2016 |
| WO | 2015/026386 A1 | 2/2015 |
| WO | 2015/090445 A1 | 6/2015 |

OTHER PUBLICATIONS

International Search Report and Written Opinion dated Jul. 21, 2020 issued in PCT Application No. PCT/IB2020/054541, consisting of 13 pages.

(Continued)

*Primary Examiner* — Yonas A Bayou
(74) *Attorney, Agent, or Firm* — Weisberg I.P. Law, P.A.

(57) ABSTRACT

A method, system and apparatus are disclosed. In one or more embodiments, a differential privacy, DP, node is provided. The DP node includes processing circuitry configured to: receive a query request; receive a first input corresponding to a utility parameter; receive a second input corresponding to a privacy parameter; select a baseline DP mechanism type based at least on a query request type of the query request, the first input and the second input, where the baseline DP mechanism type includes at least a noise parameter; generate a noise distribution based on the baseline DP mechanism type using a first value of the noise parameter; and determine a DP query result based on apply- (Continued)

ing the noise distribution to the query request applied on a data set.

20 Claims, 9 Drawing Sheets

(56) References Cited

U.S. PATENT DOCUMENTS

| | | | | |
|---|---|---|---|---|
| 2015/0235051 A1* | 8/2015 | Fawaz | G06F 21/6245 | 726/26 |
| 2017/0109544 A1* | 4/2017 | Chen | G06F 21/6254 | |
| 2017/0169253 A1* | 6/2017 | Curcio | G06F 21/6254 | |
| 2017/0235974 A1* | 8/2017 | Zhang | G06F 16/248 | 726/26 |
| 2018/0239925 A1* | 8/2018 | Nerurkar | G06F 17/16 | |
| 2019/0065775 A1* | 2/2019 | Klucar, Jr. | G06F 16/24552 | |
| 2021/0319131 A1* | 10/2021 | Salomon | G06F 16/24528 | |

OTHER PUBLICATIONS

Boaz Barak et al., Privacy, Accuracy, and Consistency Too: A Holistic Solution to Contingency Table Release; In Proceedings of the Twenty-sixth ACM SIGMODSIGACT-SIGART Symposium on Principles of Database Systems, PODS '07, pp. 273-282, New York, NY, USA, 2007. ACM., consisting of pages.

Graham Cormode et al., Differentially Private Spatial Decompositions; IEEE 28th International Conference on Data Engineering, pp. 20-31, Apr. 2012, consisting of 12 pages.

Bolin Ding et al., Differentially Private Data Cubes: Optimizing Noise Sources and Consistency; Proceedings of SIGMOD 2011 and PODS 2011, pp. 217-228, 2011, consisting of 12 pages.

Cynthia Dwork, Differential Privacy: A Survey of Results; (2008). Imprisoned mothers and their children. In B. H. Zaitzow & J. Thomas (Eds.), Women in prison: Gender and social control (pp. 119-136). London: Lynne Rienner Publishers, consisting of 19 pages.

Michael Hay et al., Boosting the Accuracy of Differentially Private Histograms Through Consistency; Proc. VLDB Endow., 3(1-2): 1021-1032, Sep. 2010, consisting of 12 pages.

Chao Li et al., Optimizing Linear Counting Queries Under Differential Privacy; In PODS, pp. 123-134. ACM, 2010, consisting of 12 pages.

Xiaokui Xiao et al., Differential Privacy Via Wavelet Transforms; In Proceedings of the 26th International Conference on Data Engineering, ICDE 2010, Mar. 1-6, 2010, Long Beach, California, USA [34], pp. 225-236, consisting of 15 pages.

* cited by examiner

UTILITY OPTIMIZED DIFFERENTIAL PRIVACY SYSTEM

CROSS-REFERENCE TO RELATED APPLICATIONS

This application is a Submission Under 35 U.S.C. § 371 for U.S. National Stage Patent Application of International Application No.: PCT/IB2020/054541, filed May 13, 2020 entitled "UTILITY OPTIMIZED DIFFERENTIAL PRIVACY SYSTEM," which claims priority to U.S. Provisional Application No. 62/847,624, filed May 14, 2019, entitled "UTILITY OPTIMIZED DIFFERENTIAL PRIVACY SYSTEM," the entireties of both of which are incorporated herein by reference.

TECHNICAL FIELD

The present disclosure relates to information security, and in particular, to a differential privacy system that allows for dynamic utility input.

BACKGROUND

Differential privacy is a formal framework that helps provide useful statistical databases while quantifying the privacy level of the individual information in the database. One aspect of differential privacy is that the presence or absence of any individual data in the database may not affect the final released statistical information significantly, thus differential privacy may provide strong privacy guarantees against an adversary with arbitrary auxiliary information. Differential privacy is noted as illustrated in FIG. 1 where for all neighboring databases x and x' and for all subsets of transcripts: $\Pr[A(x') \in S] \le e^\epsilon \Pr[A(x') \in S]$.

In other words, differential privacy is a privacy-preserving constraint imposed on the query output releasing mechanisms, and to make use of the released information, it may be beneficial to understand the fundamental trade-off between utility (accuracy) and privacy. In the existing works on studying the trade-off between accuracy and privacy in differential privacy, the usual metric of accuracy is in terms of the variance, or magnitude expectation of the noise added to the query output.

In a first existing work of post-processing, the output of a differential privacy mechanism operates on a linear program that could preserve all low-order marginals up to a small error. In a second work, a hierarchical histogram is demonstrated for achieving lower error rate than base-line differential privacy (DP) solutions for a fixed domain, which also help ensure the error rate does not grow with the size of database. Different than one-dimensional datasets solution described in the second existing work, a third existing work proposes Privelet that improves accuracy on datasets with arbitrary dimensions and that may reduce error to 25% compared to 70% as baseline error rate. In a fourth existing work, quadtrees and kd-trees are applied to provide techniques for parameter setting to improve accuracy on spatial data. In a fifth existing work, a general noise-control framework is introduced on data cubes. In a sixth existing work, the two range queries are unified over histograms into one framework and formally analyze the error rate.

The existing works described above provide different optimization methods, such as, apply Fourier basis queries to optimize low-order marginals, generate hierarchical ranges to provide better results from one-dimensional queries. One problem with differential privacy system in these works is that the data analyst's utility requirement from the result of the query is not addressed. In other words, the utility level of the query results only depends on the input from data owner, namely, the privacy constraint $\epsilon$, and not on input from the data analyst. The data owner's privacy level may achieve the $\epsilon$-differential privacy guarantee by adding noise to the original query results, e.g., in Laplace mechanism, the noise parameter b is specified to $$b \ge \frac{\Delta q}{\epsilon},$$

where $\Delta q$ is the sensitivity of the query.

However, as shown in FIG. 2, all the solutions fall in a 2-dimensional search space to optimize utility level for data analyst. The data analyst is able to input his/her utility requirement is not addressed in these existing works, i.e., none of the existing works described above allow for the data analyst to specify the expected error rate as an input to generate the anonymized query results.

SUMMARY

Some embodiments advantageously provide a method and system for differential privacy system that allows for dynamic utility input.

As described herein, the data analyst in a differential privacy system is not able to input his/her utility requirement in existing systems. The present disclosure solves the problem with the existing system by allowing inputs from both data analysts and data owner where, in one or more embodiments, the present disclosure leverages the search space from 2-dimensional space to 3-dimensional space by using randomization for the noise parameter from DP mechanisms.

Some embodiments advantageously provide methods, systems, and apparatuses for a differential privacy system that allows for dynamic utility input.

One or more embodiments provide for a utility maximized differential privacy system namely: Randomly Parameterizing Differentially private mechanisms ($R^2DP$), which helps improve the privacy-utility trade-off in differential privacy mechanism design by considering the privacy constraints from data owner and the utility constraint from data analyst.

In particular, in one or more embodiments, after inputting both privacy and utility constraints from both data owner and data analyst, the $R^2DP$ system generates optimal privacy-utility trade-off such as by applying a second distribution on the noise parameter. The noise parameter is used in turn in the differential privacy mechanism. This type of two-folded distribution may be referred to as mixture distributions (resp. compound) distributions, depending on the case where the set of component distributions is discrete (resp. continues), respectively.

The second distribution on the noise parameter provides a third searching dimension to help unify the existing works and/or solutions. As described herein, $R^2DP$ can achieve a significantly better privacy-utility trade-off compared to the baseline differential privacy mechanisms.

Also, $R^2DP$ is tested in various existing differentially private mechanisms, applications and both formally and experimentally demonstrate the effectiveness of using $R^2DP$.

According to one aspect of the disclosure, a differential privacy, DP, node is provided. The DP node includes processing circuitry configured to: receive a query request, receive a first input corresponding to a utility parameter, receive a second input corresponding to a privacy parameter, select a baseline DP mechanism type based at least on a query request type of the query request, the first input and the second input where the baseline DP mechanism type including at least a noise parameter, generate a noise distribution based on the baseline DP mechanism type using a first value of the noise parameter, and determine a DP query result based on applying the noise distribution to the query request applied on a data set.

According to one or more embodiments, the processing circuitry is further configured to: determine a noise parameter distribution for the noise parameter, and select the first value of the noise parameter from the noise parameter distribution, the first value of the noise parameter having a greater utility than the remaining plurality of values of the noise parameter distribution. According to one or more embodiments, the noise parameter distribution for the noise parameter meets requirements for the first and second inputs.

According to one or more embodiments, the noise parameter distribution corresponds to a plurality of values of the noise parameter including the first value where the selection of the first value of the plurality of values of the noise parameter is based at least on the first value being greater than or equal to a query sensitivity associated with the query request. According to one or more embodiments, the DP query result corresponds to an aggregation of a query result to the query request and the noise distribution. According to one or more embodiments, the baseline DP mechanism type includes one of a Laplace mechanism type, exponential mechanism type and Gaussian mechanism type.

According to one or more embodiments, the processing circuitry is further configured to determine a query sensitivity associated with the query request. According to one or more embodiments, the selection of the baseline DP mechanism type is based at least on the query sensitivity. According to one or more embodiments, the privacy parameter corresponds to a privacy constraint associated with a probability of a predefined loss of privacy. According to one or more embodiments, the utility parameter corresponds to an error constraint.

According to another aspect of the disclosure, a method implemented by a differential privacy, DP, node is provided. A query request is received. A first input corresponding to a utility parameter is received. A second input corresponding to a privacy parameter is received. A baseline DP mechanism type is selected based at least on a query request type of the query request, the first input and the second input where the baseline DP mechanism type includes at least a noise parameter. A noise distribution is generated based on the baseline DP mechanism type using a first value of the noise parameter. A DP query result is determined based on applying the noise distribution to the query request applied on a data set.

According to one or more embodiments, a noise parameter distribution for the noise parameter is determined. The first value of the noise parameter is selected from the noise parameter distribution, the first value of the noise parameter having a greater utility than the remaining plurality of values of the noise parameter distribution. According to one or more embodiments, the noise parameter distribution for the noise parameter meets requirements for the first and second inputs. According to one or more embodiments, the noise parameter distribution corresponds to a plurality of values of the noise parameter including the first value. The selection of the first value of the plurality of values of the noise parameter is based at least on the first value being greater than or equal to a query sensitivity associated with the query request.

According to one or more embodiments, the DP query result corresponds to an aggregation of a query result to the query request and the noise distribution. According to one or more embodiments, the baseline DP mechanism type includes one of a Laplace mechanism type, exponential mechanism type and Gaussian mechanism type. According to one or more embodiments, a query sensitivity associated with the query request is determined.

According to one or more embodiments, the selection of the baseline DP mechanism type is based at least on the query sensitivity. According to one or more embodiments, the privacy parameter corresponds to a privacy constraint associated with a probability of a predefined loss of privacy. According to one or more embodiments, the utility parameter corresponds to an error constraint.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
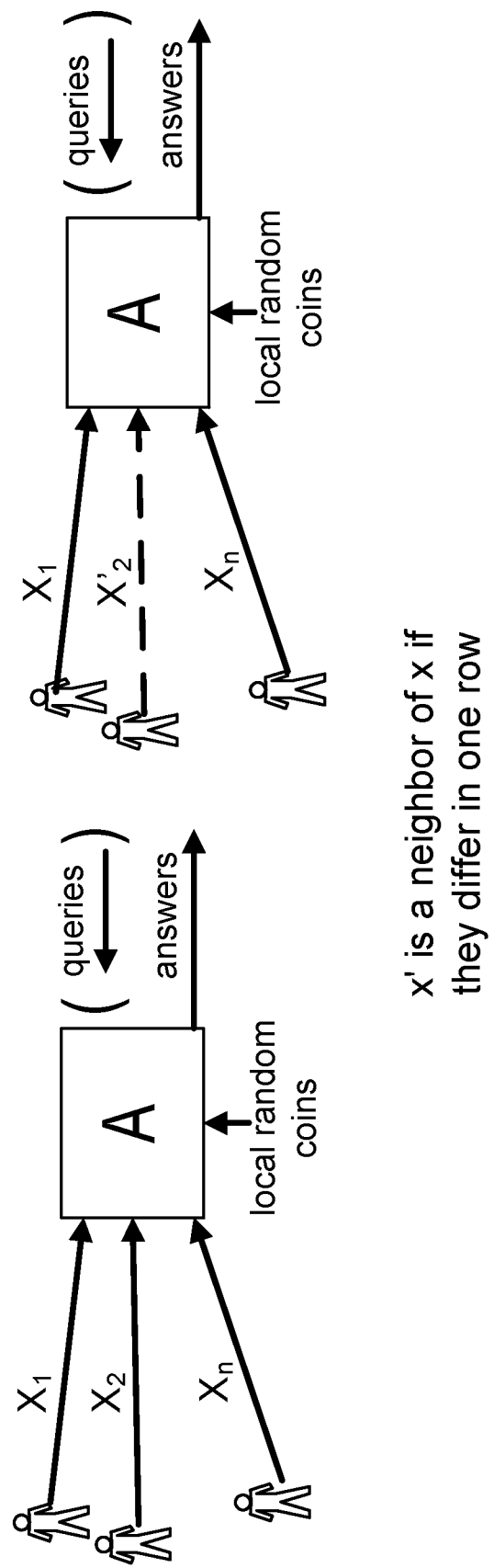
FIG. 1 is a diagram of differential privacy notation.
Figure 2:
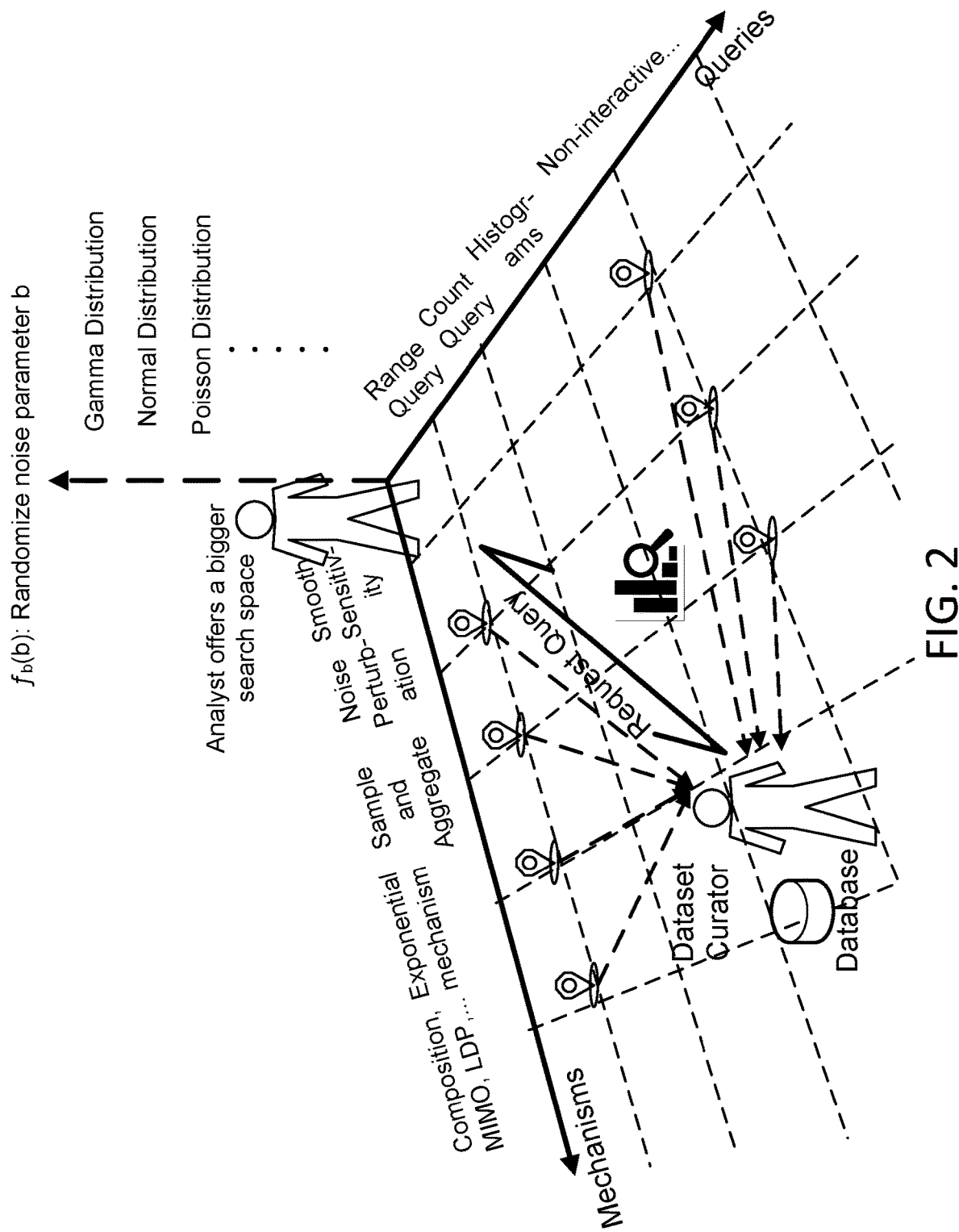
FIG. 2 is a search space for finding the maximum utility for the Laplace Mechanism.

As described above, existing differential privacy systems suffer from at least one issue. The present disclosure solves at least a portion of the at least one issue with existing systems by providing one or more of the following:

a system which is based on the utility needs expressed by the data analyst and the privacy needs defined by the data owner to build a specific DP implementing the needed trade-off between privacy and utility.

a system that enables the data analyst to input a utility value. This utility value is then used to build a specific DP taking into account the privacy requirement from data owner without negatively affecting and/or damaging data privacy. The existing work and/or solutions do not use nor have any utility value as a dynamic input as this value is fixed in the existing systems. This utility value is used as a part of the system, i.e., $R^2DP$ system, to build a specific DP, which is different from existing DPs.

the system helps maintains all the operation processes from the data owner side, which may require little to no effort from the data owner's side.

the system helps provide optimal utility results to the data analyst by tuning a second distribution on the noise of the DP mechanism. The system may compute a randomized parameter for the randomization to provide maximum utility complying with privacy needs.

the system provides a framework in the field of DP that leverages the existing 2-dimensional solution search space into a 3-dimensional solution search space by adding a randomized parameter for the randomization as a third axis. This approach then increases the space of possible DP solutions.

the system may be used in various existing DP mechanisms, which has been demonstrated formally and experimentally.

In the following, it is assumed that our DP is implemented using Laplace mechanism. However, our approach is valid for any DP with other distribution, e.g., Gaussian mechanism.

Before describing in detail exemplary embodiments, it is noted that the embodiments reside primarily in combinations of apparatus components and processing steps related to a differential privacy system that allows for dynamic utility input. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Table 1 defines symbols used herein in one or more examples.

TABLE 1

| Notations | Descriptions |
| --- | --- |
| $\epsilon$ | Privacy constraint from data owner |
| q | Query from data analyst |
| $\Delta q$ | Query sensitivity |
| b | Noise parameter in Laplace mechanism |
| q(D) | Query result without noise |
| $\omega$ | Noise/Noise Distribution |
| $\gamma$ | Error constraint from data analyst |
| $\lambda$ | The parameter for Exponential distribution |

Embodiments provide a differential privacy system that allows for dynamic utility input.

Figure 3:
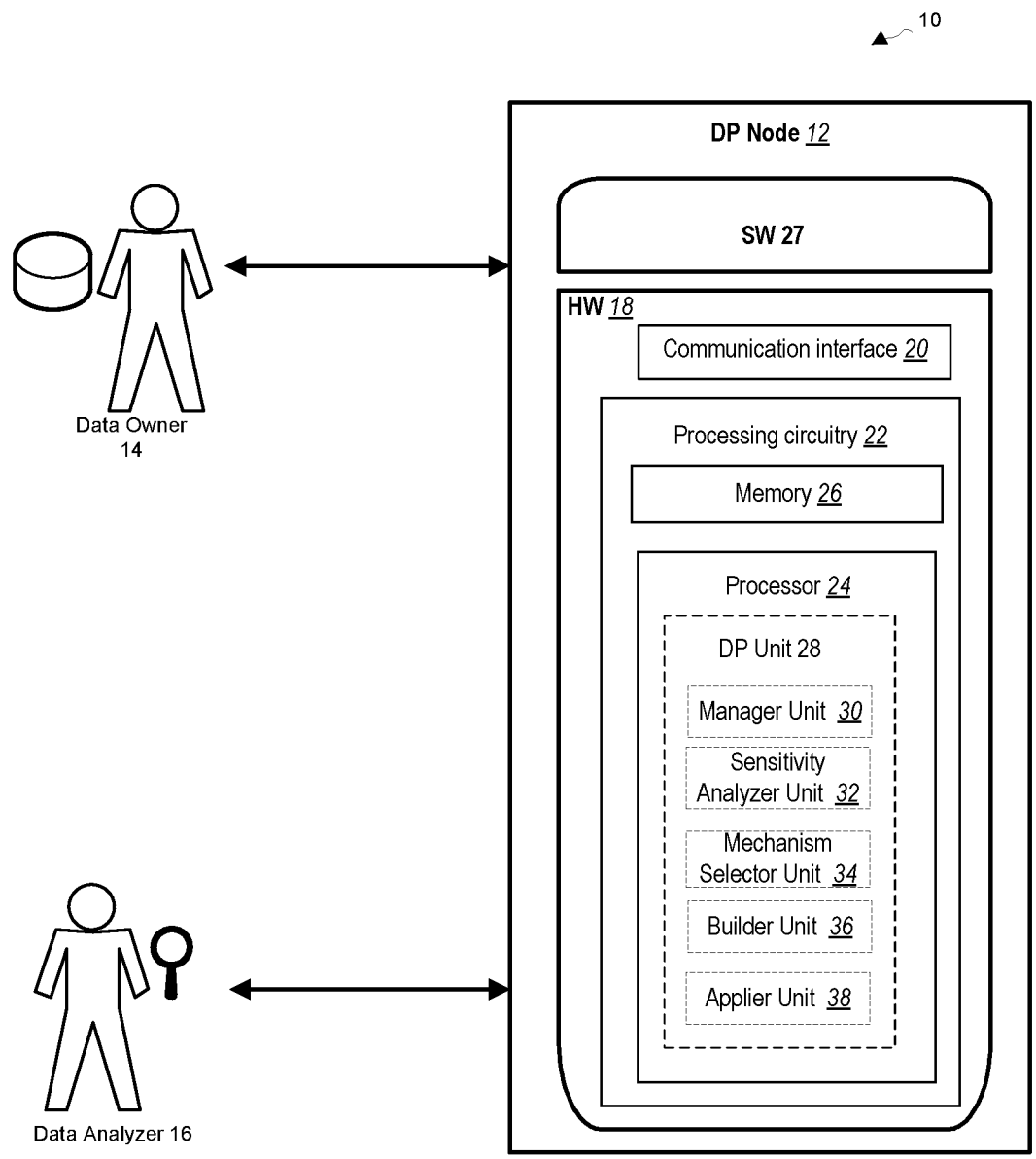
FIG. 3 is an example differential privacy system in accordance with one or more embodiments of the disclosure.

Referring again to the drawing figures, in which like elements are referred to by like reference numerals, there is shown in FIG. 3 a schematic diagram of a system 10, according to an embodiment. System 10 includes differential privacy (DP) node 12 that is configured to provide differential privacy functionality while helping balance a trade-off between privacy and utility, as described herein. DP node 12 may be in communication with data owner 14 and data analyst/analyzer 16. Data owner 14 and data analyst/analyzer 16 are discussed below.

DP node 12 includes hardware 18 configured to communicate with data owner 14 and/or data analyst 16, among other entities in system 10. The hardware 18 may include a communication interface 20 for setting up and maintaining a wired or wireless connection with an interface of a different communication device of the communication system 10, In the embodiment shown, the hardware 18 further includes processing circuitry 22. The processing circuitry 22 may include a processor 24 and a memory 26. In particular, in addition to or instead of a processor, such as a central processing unit, and memory, the processing circuitry 22 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 24 may be configured to access (e.g., write to and/or read from) the memory 26, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the DP node 12 further has software 27 stored internally in, for example, memory 26, or stored in external memory (e.g., database, storage array, network storage device, etc.) accessible by the DP node 12 via an external connection. The software 27 may be executable by the processing circuitry 22. The processing circuitry 22 may be configured to control any of the methods and/or processes described herein and/or to cause such methods, and/or processes to be performed, e.g., by DP node 12. Processor 24 corresponds to one or more processors 24 for performing DP node 12 functions described herein. The memory 26 is configured to store data, programmatic software code and/or other information described herein. In some embodiments, the software 27 may include instructions that, when executed by the processor 24 and/or processing circuitry 22, causes the processor 24 and/or processing circuitry 22 to perform the processes described herein with respect to DP node 12. For example, processing circuitry 22 of the DP node 12 may include DP unit 28 configured to perform one or more functions described herein such as with respect to DP functionality. In one or more embodiments, the DP unit 28 may corresponds to one or more units such as manager unit 30, sensitivity analyzer unit 32, mechanism selector unit 34, builder unit 36 and applier unit 38 that may be in communication with each other. However, functionality of one or more units may be implemented in another node or device different from DP node 12. Manager unit 30 is a communication channel and interface for DP node 12.

Manager unit 30 may be configured to perform one or more of the following functions:
Gather the privacy constraint $\epsilon$ from data owner 14.
Gather the utility constraint $\gamma$ from data analyst 16.
Gather query from data analyst 16.
Communicate with Sensitivity Analyzer unit 32 to gather query sensitivity.
Pass one or more constraints to mechanism selector unit 34.

Sensitivity analyzer 32 is configured to accept a query request from manager unit 30 and evaluate query sensitivity based on the query request. The query sensitivity $\Delta q$, may be sent back to manager unit 30 as one of the constraints. One or more functions of sensitivity analyzer 32 include:
Receiving query request q from manager unit 30 as input;
Evaluating query sensitivity, $\Delta q$;
Outputting query sensitivity to manager unit 30.

Mechanism selector unit 34 is configured to receive as input one or more or all of the constraints gathered/received by manager unit 30. Then, using a baseline search space, a mechanism to maximize the utility of a query that is provided by the data analyst is selected. An example of the selection is provided in Example 1.

EXAMPLE 1

If the input application is one or more filtering applications, the mechanism selector unit 34 may select a Gaussian mechanism instead of Laplace mechanism since Gaussian mechanism may perform better in filtering applications.

This DP provides the best trade-off between privacy and utility. The best performed DP mechanism may be selected for further permutation. One or more functionalities for mechanism selector unit 34 include:
Receive $\gamma$, $\epsilon$, $\Delta q$, q as inputs;
Select a DP mechanism for further processing; and
Output the selected DP mechanism to a parameter distribution analyzer builder unit 36.

Builder unit 36 may include a parameter distribution analyzer and a parameter tuner. The optimal distribution for the noise parameter from the selected DP mechanism may be generated. Then noise may be generated based on each noise parameter. One of the generated noises may be selected from Parameter Tuner to mix with the original query result q(D).

One or more functionalities provided by builder unit 36 are as follows:

A Parameter Distribution Analyzer takes the selected DP mechanism, e.g., Laplace mechanism, as an input.

The Parameter Distribution Analyzer generates an optimal distribution for the noise parameter in the selected DP mechanism, e.g., b in Laplace mechanism, as discussed in detail in the "Optimal Distribution Computation for the Noise Distribution" section. The generated optimal distribution for the noise parameter may be referred to as the DPlb.

A Parameter Tuner may receive DPlb parameter and generates noises according to DPlb.

One of the noises that is sampled from distribution DPlb is selected as an output of the Parameter Tuner, where the selected noise is referred to as noise $\omega$.

Applier unit 38 uses noise $\omega$ and the original query result q(D) as inputs and generates $\epsilon$—differential privacy query results for data analyst 16.

Although FIG. 3 shows various "units" such as DP unit 28, manager unit 30, sensitivity unit analyzer unit 32, etc., as being within a respective processor, it is contemplated that these units may be implemented such that a portion of the unit is stored in a corresponding memory within the processing circuitry 22. In other words, the units may be implemented in hardware or in a combination of hardware and software within the processing circuitry. Further, in one or more embodiments, units 28-38 may be distributed over one or more devices and/or elements in system 10 while still performing the functionality described herein.

Figure 4:
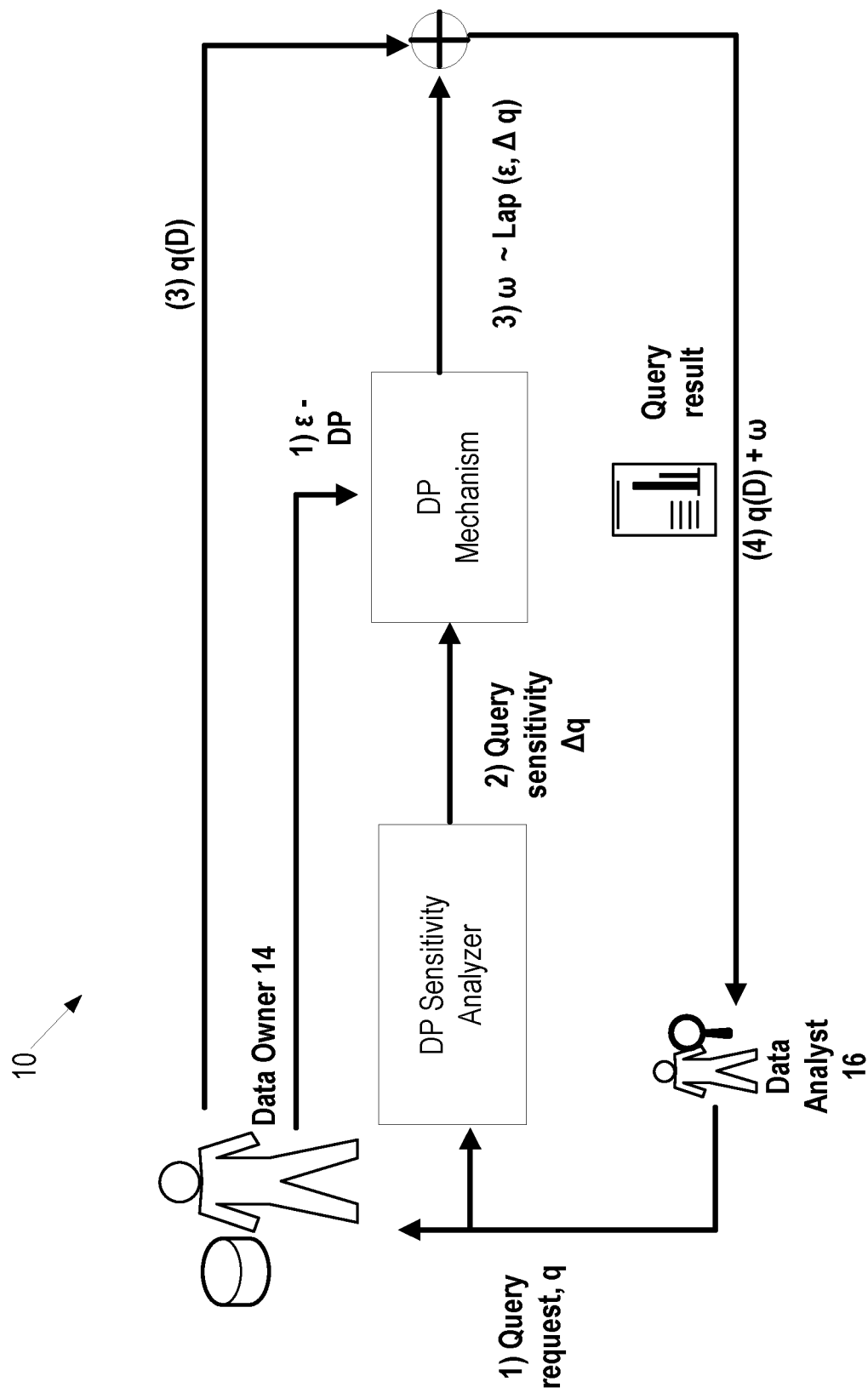
FIG. 4 is an example architecture of a baseline differential privacy system.
Figure 5:
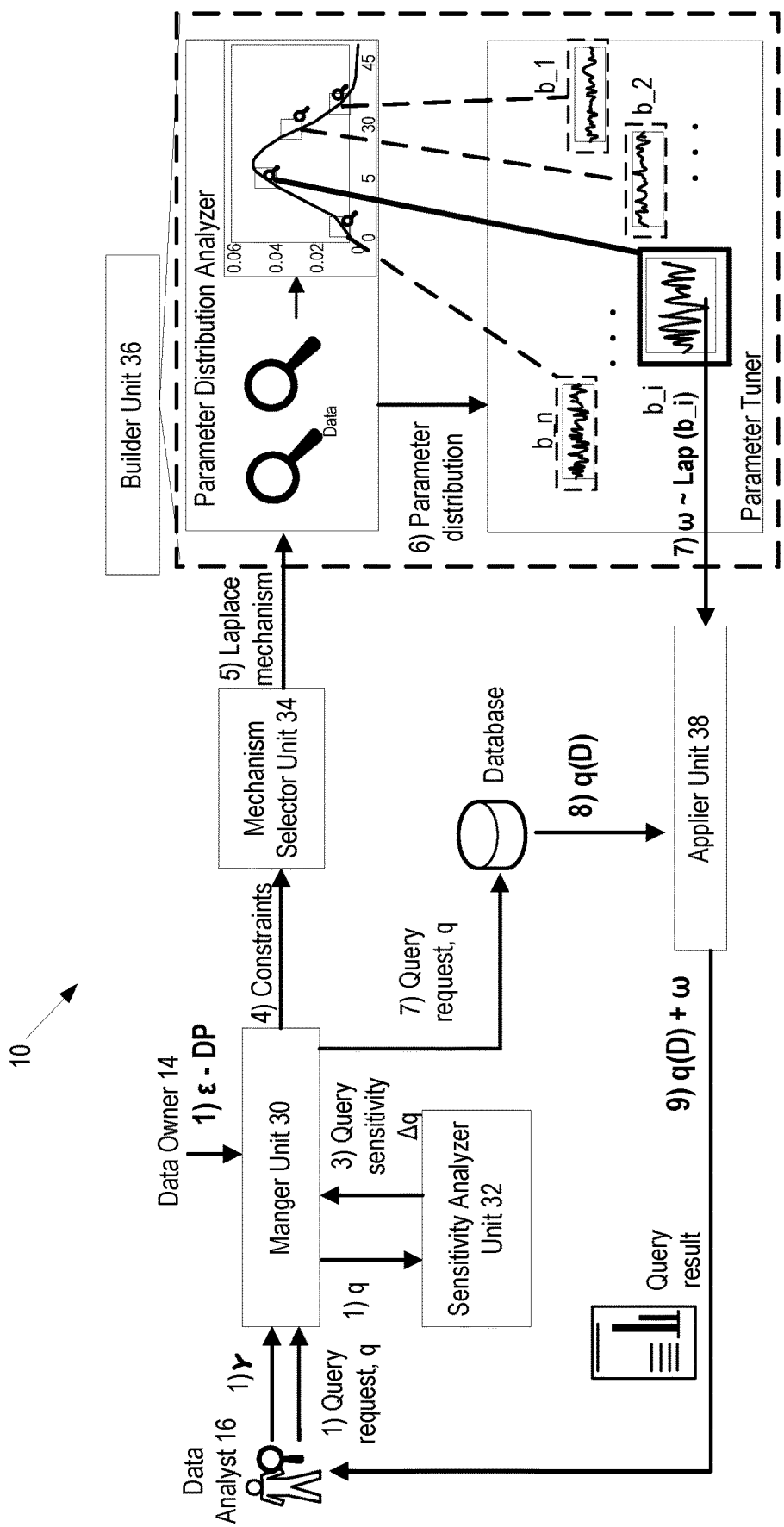
FIG. 5 is an example architecture of the differential privacy system in accordance with one or more embodiments of the disclosure.

FIG. 4 is a block diagram of system 10 that is used as a baseline DP for comparison to the system 10 illustrated in FIG. 5. In FIG. 4, in step 1, data owner 14 generates a privacy requirement E based on the different parameters, such as, the type of data, the regulations for privacy protection, the sensitivity of the data, and provides the privacy requirements to a DP mechanism, and a query request, q, is submitted to the data owner 14. In step 2, query sensitivity, $\Delta q$, is generated based on the input query and is sent to the DP mechanism. In step 3, the query result q(D) is aggregated with noise $\omega$. In step 4, data analyst 16 is provided with the query result, i.e., with q(D)+$\omega$.

Below, first, system 10 is compared to the baseline DP solution, then the corresponding workflow for system is discussed in detail with respect to FIG. 5. Compared with FIG. 4, system 10 has the following features:
1) system 10 provides a solution to gather and distribute inputs and outputs from different components through system 10. In particular, the value $\gamma$ that is dynamically capture from the data analyst 16 has not been considered in the previous existing work. This value and its usage, as described herein, are not contemplated in existing works.
2) Mechanism selector unit 34 provides the selection of baseline DP mechanisms and mechanism types based on one or more constraints. Instead of having a fixed DP mechanism, which is specified by data owner 14, mechanism selector unit 34 selects a proper DP mechanism based on the constraints from both parties.
3) Parameter Distribution Analyzer and Parameter Tuner of builder unit 36 provide a method/process for generating noise by adding a new randomization dimension. System 10 helps guarantee the generation of a better utility outcome than baseline DP mechanism without damaging and/or negatively affecting the required privacy level.

The detailed workflow and/or process for system 10 is as follows:

Step 1. Gather and/or receive input from both data owner 14 and data analyst 16.
> In one or more embodiments, data owner 14 generates his/her privacy requirement $\epsilon$ based on the different parameters, such as, the type of data, the regulations for privacy protection, the sensitivity of the data.
> In one or more embodiments, data analyst 16 analyzes his/her utility needs, $\gamma$, to audit/work on the output of the designed query. The utility needs may be generated by data analyst 16 based on expert experience or adjusted by data analyst 16 based on the output from the previous queries.
> In one or more embodiments, data analyst 16 submits the query to manager unit 30.

Step 2. Generate query sensitivity
> In one or more embodiments, manager unit 30 sends the query to sensitivity analyzer unit 32.
> In one or more embodiments, sensitivity analyzer unit 32 generates query sensitivity, $\Delta q$, based on the input query.

Step 3. Gather query sensitivity
> In one or more embodiments, sensitivity analyzer unit 32 sends the query sensitivity, $\Delta q$, back to manager unit 30.

Step 4. Manager unit 30 sends the constraints to mechanism selector unit 34. For example, all the constraints, $\epsilon$, $\gamma$ and $\Delta q$, and q are sent to mechanism selector unit 34.

Step 5. Mechanism selector unit 34 provides a DP mechanism and outputs the DP mechanism to parameter distribution analyzer of builder unit 36. In this step, mechanism selector unit 34 selects a DP mechanism from one or more DP mechanisms, such as Laplace mechanism, Gaussian mechanism, Exponential mechanism.

Figure 6:
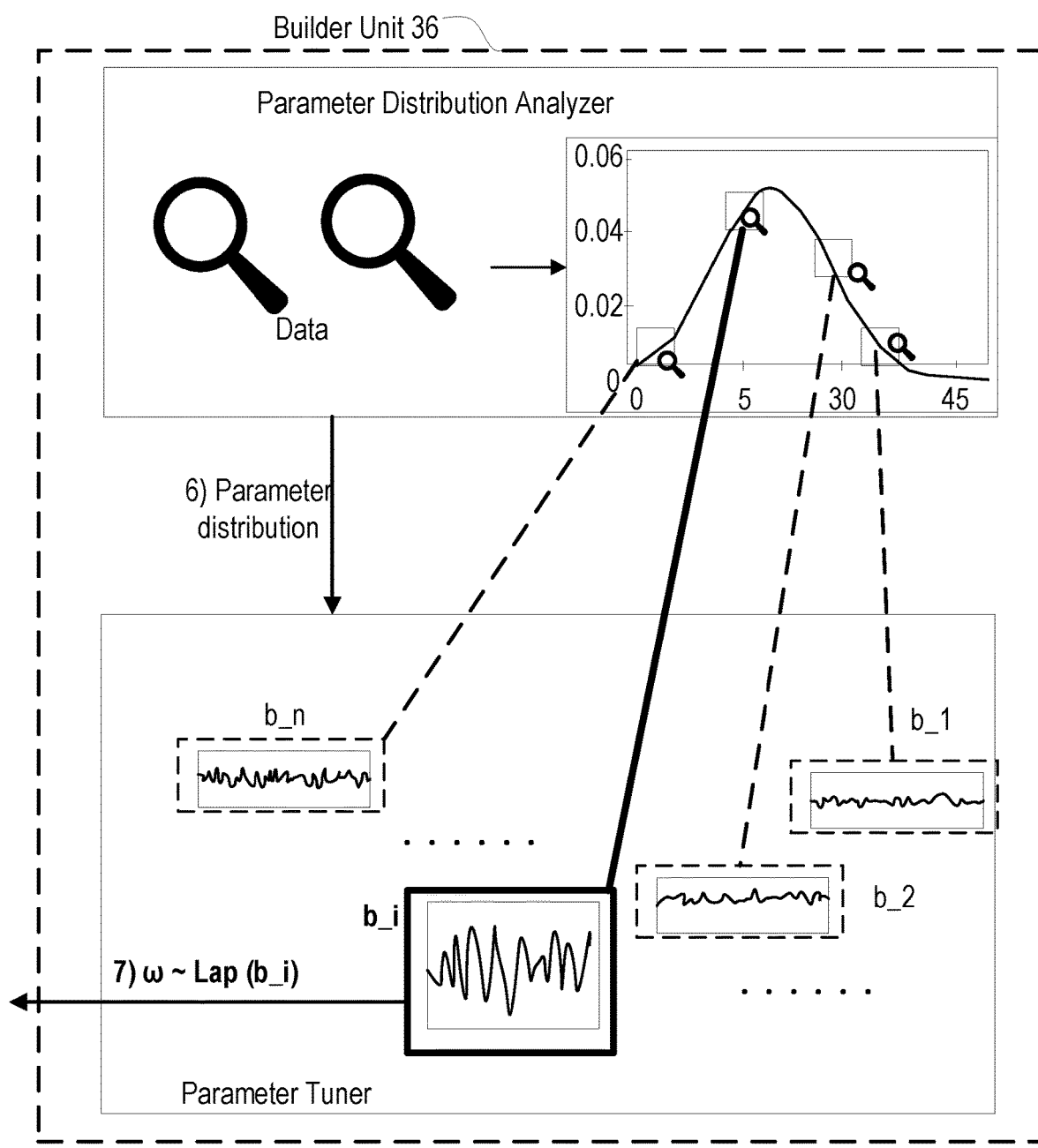
FIG. 6 is a diagram of a builder unit in accordance with the one or more embodiments of the disclosure.

Step 6. Parameter distribution generation. The selected DP mechanism, such as Laplace mechanism, may be input into parameter distribution analyzer. The noise parameter, such as b in the Laplace mechanism, may be passed to the distribution finder, i.e., parameter distribution, to generate the optimal distribution that fits to the requirements from both parties, i.e., data owner 14 and data analyst 16. Then the parameter distribution may output to parameter tuner. The parameter distribution step performed by builder unit 36 is illustrated in detail in FIG. 6.

Steps 7-8. Applier unit 38 receives and/or gathers inputs.
> The Parameter Tuner generates the noise from parameter distribution from step 6 and outputs noise $\omega$ based on one of the chosen parameters for Laplace mechanism $b_i$;
> Manager unit 30 sends query q to the database in Step 7, which belong to data owner and database returns the query result q(D) in Step 8.

Step 9. Return query result to data analyst 16.
> Applier unit 38 aggregates the noise $\omega$ and q(D) to further form the query result for data analyst 16.
> Applier unit 38 sends query result back to data analyst 16.

Figure 7:
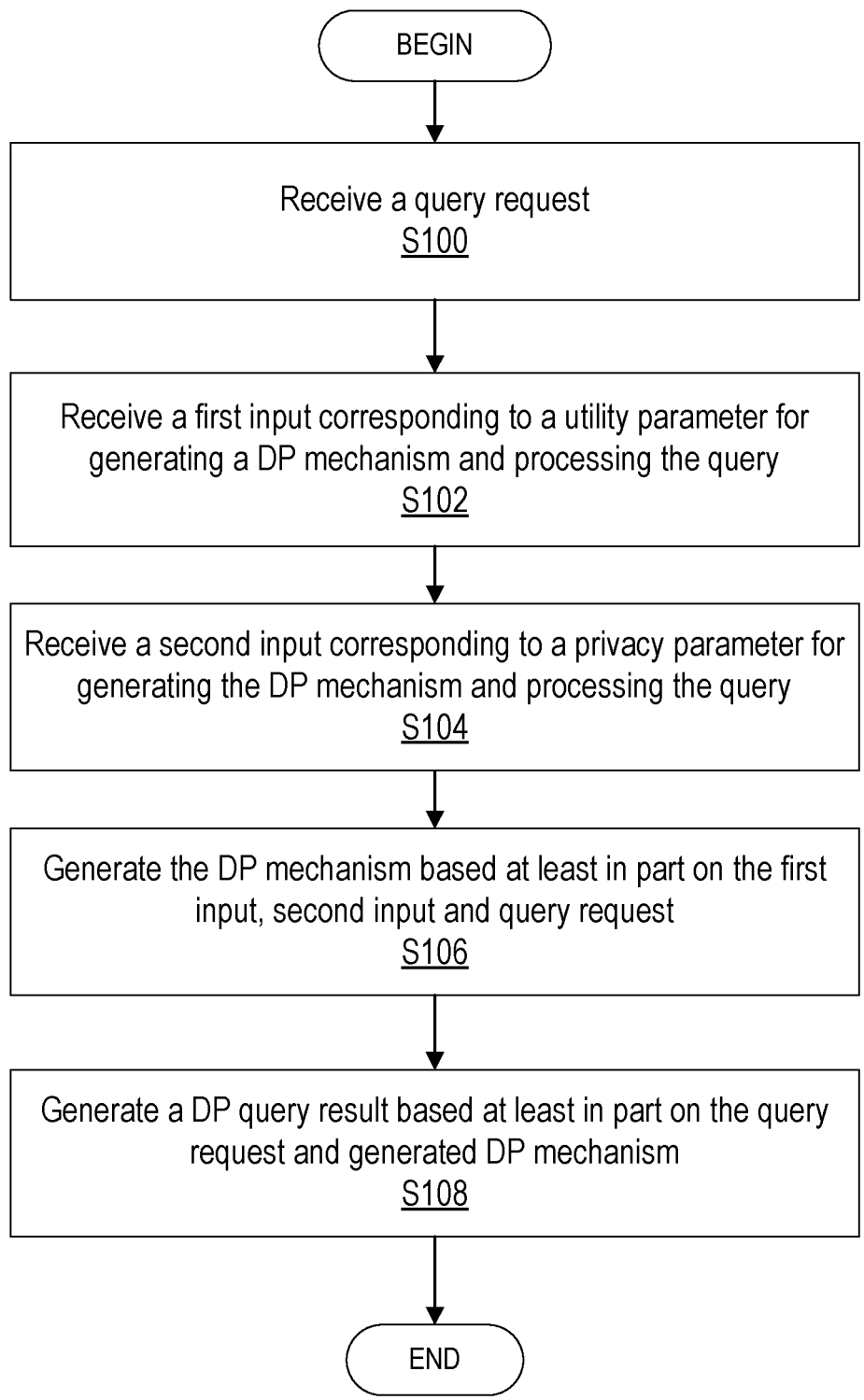
FIG. 7 is flow diagram of an example process of the differential privacy system in accordance with one or more embodiments of the disclosure.

FIG. 7 is a flowchart of an example process in DP node 12 in accordance with one or more embodiments of the disclosure. One or more Blocks and/or functions performed by DP node 12 may be performed by one or more elements of DP node 12 such as by DP unit 28, management unit 30, sensitivity analyzer unit 32, etc., in processing circuitry 22, processor 24, etc. In one or more embodiments, DP node 12 such as via one or more of processing circuitry 22, processor 24, DP unit 28, manager unit 30, etc., is configured to receive (Block S100) a query request. In one or more embodiments, DP node 12 such as via one or more of processing circuitry 22, processor 24, DP unit 28, manager unit 30, etc., is configured to receive (Block S102) a first input corresponding to a utility parameter for generating a DP mechanism and processing the query.

In one or more embodiments, DP node 12 such as via one or more of processing circuitry 22, processor 24, DP unit 28, manager unit 30, etc., is configured to receive (Block S104) a second input corresponding to a privacy parameter for generating the DP mechanism and processing the query. In one or more embodiments, DP node 12 such as via one or more of processing circuitry 22, processor 24, DP unit 28, manager unit 30, etc., is configured to generate (Block S106) the DP mechanism based at least in part on the first input, second input and query request. In one or more embodiments, DP node 12 such as via one or more of processing circuitry 22, processor 24, DP unit 28, manager unit 30, etc., is configured to generate (Block S108) a DP query result based at least in part on the query request and generated DP mechanism.

According to one or more embodiments, the processing circuitry 22 is further configured to determine a query sensitivity based at least in part on the query request, the DP mechanism being generated based at least in part on the query sensitivity. According to one or more embodiments, the processing circuitry 22 is further configured to: select a baseline DP mechanism type based at least in part on the first input, second input and the query sensitivity, generate a noise parameter distribution for the baseline DP mechanism type that meets the requirements of the first input and second input, select a noise parameter from the generated noise parameter distribution, generate a noise distribution based at least in part on the selected noise parameter, generate noise for the query based at least in part on the noise distribution, and determine the DP query result based at least in part on the query result and the generated noise for the query.

Figure 8:
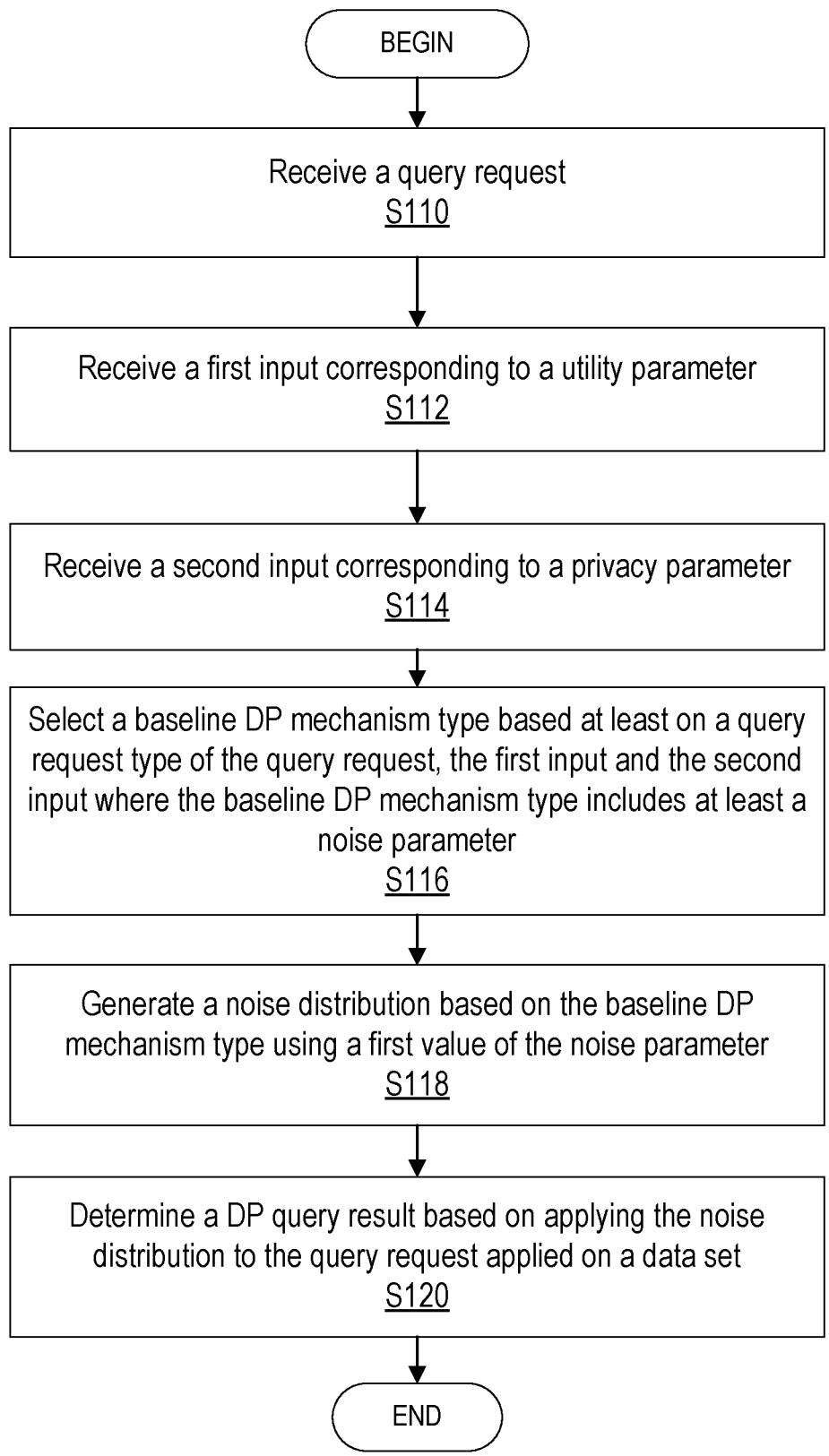
FIG. 8 is flow diagram of an example process of the differential privacy system in accordance with one or more embodiments of the disclosure.

FIG. 8 is a flowchart of another example process in DP node 12 in accordance with one or more embodiments of the disclosure. One or more Blocks and/or functions performed by DP node 12 may be performed by one or more elements of DP node 12 such as by DP unit 28, management unit 30, sensitivity analyzer unit 32, etc., in processing circuitry 22, processor 24, etc. In one or more embodiments, DP node 12 such as via one or more of processing circuitry 22, processor 24, DP unit 28, manager unit 30, etc., is configured to receive (Block S110) a query request, as describe herein. In one or more embodiments, DP node 12 such as via one or more of processing circuitry 22, processor 24, DP unit 28, manager unit 30, etc., is configured to receive (Block S112) a first input corresponding to a utility parameter, as described herein.

In one or more embodiments, DP node 12 such as via one or more of processing circuitry 22, processor 24, DP unit 28, manager unit 30, etc., is configured to receive (Block S114) a second input corresponding to a privacy parameter, as described herein. In one or more embodiments, DP node 12 such as via one or more of processing circuitry 22, processor 24, DP unit 28, manager unit 30, etc., is configured to select (Block S116) a baseline DP mechanism type based at least on a query request type of the query request, the first input and the second input where the baseline DP mechanism type includes at least a noise parameter (i.e., b), as described herein. For example, the selected baseline DP mechanism type may be change based on a use case scenario having a specific set of factors such as the query type, utility parameter input from the data analyst 16 (e.g., some DP mechanisms work better with statistical query, some work better with analysis query, etc.), and the privacy needs/requirements from the data owner 14. That is, the base DP mechanism/mechanism type may be selected based on a combination of specific factors. In one example, a Laplace mechanism type is selected as the baseline DP mechanism type as illustrated in FIG. 5.

In one or more embodiments, DP node 12 such as via one or more of processing circuitry 22, processor 24, DP unit 28, manager unit 30, etc., is configured to generate (Block S118) a noise distribution based on the baseline DP mechanism type using a first value of the noise parameter, as described herein. Using FIG. 5 as an example, the noise distribution is Lap(b_1)=omega where b_1 is the first value of the noise parameter that may be selected as described herein. In this example, b_1 is the best of the b_i(s) which may correspond to b_1 having greater utility (which is maximizing the usefulness function) with a given privacy sensitivity than the remaining b_i(s). In one or more embodiments, several iterations are performed over different b_i values to find the best b_i for the use case.

In one or more embodiments, DP node 12 such as via one or more of processing circuitry 22, processor 24, DP unit 28, manager unit 30, etc., is configured to determine (Block S120) a DP query result based on applying the noise distribution to the query request applied on a data set, as described herein.

According to one or more embodiments, the processing circuitry 22 is further configured to: determine a noise parameter distribution for the noise parameter, and select the first value of the noise parameter from the noise parameter distribution where the first value of the noise parameter has a greater utility than the remaining plurality of values of the noise parameter distribution. According to one or more embodiments, the noise parameter distribution for the noise parameter meets requirements for the first and second inputs. According to one or more embodiments, the noise parameter distribution corresponds to a plurality of values of the noise parameter including the first value. The selection of the first value of the plurality of values of the noise parameter is based at least on the first value being greater than or equal to a query sensitivity associated with the query request.

According to one or more embodiments, the DP query result corresponds to an aggregation of a query result to the query request and the noise distribution. According to one or more embodiments, the baseline DP mechanism type includes one of a Laplace mechanism type, exponential mechanism type and Gaussian mechanism type. According to one or more embodiments, the processing circuitry 22 is further configured to determine a query sensitivity associated with the query request.

According to one or more embodiments, the selection of the baseline DP mechanism type is based at least on the query sensitivity. According to one or more embodiments, the privacy parameter corresponds to a privacy constraint associated with a probability of a predefined loss of privacy. For example, a DP system may be designed with an upper limit on the amount of difference anyone's participation can make. This is the privacy budget. The DP system may allow someone to ask to submit a query that uses the whole privacy budget, or a series of queries whose total impact is no more than that one question. If the privacy budget is considered in terms of money, maybe the DP system is set to a privacy budget of $1.00 such that one query can be a single $1 question but no other questions could be asked after that, or various queries may ask a $0.30 question and seven $0.10 questions. In one or more embodiments, the privacy constraint is a degree of randomization.

According to one or more embodiments, the utility parameter corresponds to an error constraint. Since the privacy constraints (e.g., the degree of randomization) imposed by differential privacy may render the released data less useful for analysis, the data analyst 16 may specify a cost function upper-bound, e.g., the absolute value of the difference between the original result and the noisy result to be bounded by some threshold T, to conduct reliable analysis, which is an example, of the utility budget (parameter).

Optimal Distribution Computation for the Noise Distribution

The $R^2DP$ model of system 10 helps unify two parallel concepts of privacy and utility into one optimization problem under the differential privacy constraint and defined over the space of the probability distributions with positive support, e.g., exponential distribution. $R^2DP$ model can provide a strictly dominating pay off in comparison to the baseline Laplace mechanisms (with fixed parameter).

However, the focus may be shifted to investigating the optimality for Laplace mechanism as one of the generic differentially private mechanism. An algorithm (i.e., ensemble R2DP algorithm) for finding optimal usefulness by assimilating the privacy and the utility requirements with distribution parameters is illustrated below.

---

Input:
    Data owner:
        D: Database
        $\epsilon$: DP Guarantee
    Data Analyst:
        $q(\cdot)$: Query
        $\gamma$: Usefulness Parameter
        $\{a_1^{opt}, a_2^{opt}, \lambda^{opt}, \theta^{opt}, \mu^{opt}, \sigma^{opt}, a^{opt}\}$:
        Optimal parameters resulted from Lagrange multiplier function
Output:
    $q(D) + Lap(b_r)$: $\epsilon$-DP and maximally $\gamma$-useful query result
Function:
$\mathcal{F}$ $(q(D), \epsilon, \gamma, a_1^{opt}, a_2^{opt}, \lambda^{opt}, \theta^{opt}, \mu^{opt}, \sigma^{opt}, a^{opt})$
begin
  1    Compute Sensitivity $\Delta q :=$ using the inputted query
  2    $\{a_1^{opt}, a_2^{opt}, \lambda^{opt}, \theta^{opt}, \mu^{opt}, \sigma^{opt}, a^{opt}\} :=$
        Optimal parameters resulted from Lagrange multiplier function Optimal parameter finder
  3    Compute parameter for distribtition 1 as $X_1 \sim \Gamma(\lambda^{opt}, \theta^{opt})$
  4    Compute parameter for distribution 2 as $X_2 \sim \mathcal{N}^T(\mu^{opt}, \sigma^{opt}, a^{opt})$
  5    Compute $R^2DP$ noise distribution value based on $\frac{1}{b_r} = a_1^{opt} \cdot X_1 + a_2^{opt} \cdot X_2$:

6    return $q(D) + Lap(b_r)$
end

---

In particular, the algorithm above is an instance of the R2DP framework using linear combination of two different PDFs, namely, Gamma and truncated Gaussian distributions. The algorithm under the $\epsilon$-DP constraint finds the best second fold distribution using the Lagrange multiplier function which is a strategy for finding the local maxima and minima of a function subject to equality constraints (i.e., subject to the condition that one or more equations have to be satisfied exactly by the chosen values of the variables). That is, the Lagrange multiplier function is a strategy for finding the local maxima and minima of a functions subject to equality constraints (i.e., subject to the condition that one or more equations have to be satisfied exactly by the chosen values of the variables). Then, the algorithm randomly generates the noise using the two-fold distribution (e.g., Laplace distribution as the first fold) and injects it into the query for the data recipient.

The above Algorithm summarizes the result of the corresponding optimization problem over the space of two well-known probability distributions, i.e., Gamma distribution and Truncated Gaussian distribution. It is noted that the optimal answer of this problem for any set of inputted parameters, e.g., $\gamma$, $\epsilon$, $\Delta q$, is derived using Lagrange multiplier method. Precisely, all the optimal parameters, in the algorithm are computed using this method. Next, these parameters are applied to Gamma and truncated Gaussian distribution to form the optimal distribution. It is noted that this method is applicable to any other probability distribution.

Definition 1. (Usefulness Definition). A database mechanism $M_q$ is $(\gamma, \varsigma)$—useful if with probability $1-\varsigma$, for every database $d \in D$, $|M_q(d)-q(d)| \leq \gamma$.

Example 2

Figure 9:
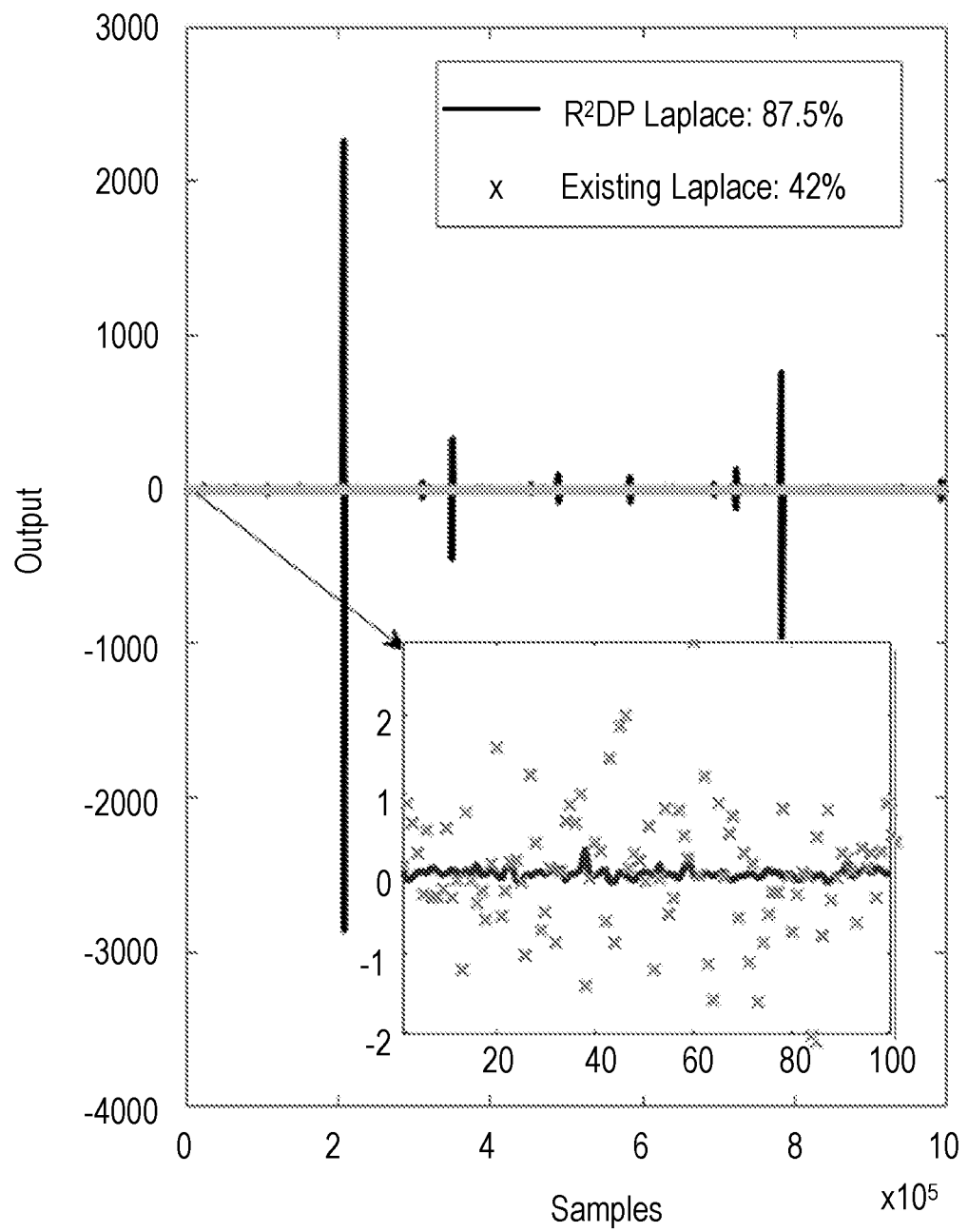
FIG. 9 is diagram of one set of results from the differential privacy system and baseline Laplace mechanism.

As a proof of concept, FIG. 9 presents a set of results to compare the performances of the existing Laplace mechanism with a $R^2DP$ Laplace mechanism using Exponential distribution. The input parameters in this example are $\epsilon=5$, $\gamma=0.1$, $\Delta q=1$, meaning that the data owner 14 is interested in 5-differential privacy whereas the data analyst 16 is interested in (or can only tolerate) the results within a 0.1 error bound with respect to the original result.

Denote by $M_q(d, 1)$ and $M_q(d, 2)$, the existing Laplace mechanism and the $R^2DP$ version, respectively, for the aforementioned specified parameters. Using the usefulness definition 1 of utility, it is expected to have $P(|M_q(d, 1)-q(D)| \leq 0.3)=0.41$ and $P(|M_q(d, 2)-q(D)| \leq 0.3)=0.87$, for which the empirical evaluation for a set of 1M samples results in 42%, 87.5% true-positive rates, respectively.

Note that the given $M_q(d, 2)$ computed by the $R^2DP$ model is meant to maximize the utility among all the exponential probability distributions and in particular, for this example, $\lambda=0.05$ was computed.

Therefore, the disclosure provides one or more of the following advantages:
  System 10 considers utility need(s) expressed by the data analyst 16 and the privacy need(s) defined by the data owner 14 to build a specific DP implementing a trade-off between privacy and utility, which is not provided for in existing systems.
  System 10 enables the data analyst 16 to dynamically input a utility value. This utility value is then used to build a specific DP taking into account the privacy requirement from data owner 14 without damaging and/or negatively affecting data privacy. Existing DP systems/approaches do not allow for dynamic input of any utility value as these systems use a fixed value. This utility value described with respect to system 10 is used to build a specific DP.
  System 10 maintains one or more operation processes from data owner 14 side, which requires minimal to no effort from data owner's side to adjust to system 10.
  System 10 provides optimal utility results to data analyst 16 by tuning second distribution on the noise of DP mechanism. System 10 computes a randomized parameter for the randomization to help provide maximum utility complying with privacy needs.
  System 10 provides a framework in the field of DP that leverages the existing 2-dimensional solution search space into a 3-dimensional solution search space by adding randomized parameter for the randomization as a third axis. This approach then increases the space of possible DP solutions.
  System 10 may be implemented into various existing DP mechanisms such as to provide for new use cases for DP in industrial world.

Some Examples

Example A1. A differential privacy (DP) node 12 comprising processing circuitry 22 configured to:
  receive a query request;
  receive a first input corresponding to a utility parameter for generating a DP mechanism and processing the query;
  receive a second input corresponding to a privacy parameter for generating the DP mechanism and processing the query;
  generate the DP mechanism based at least in part on the first input, second input and query request; and
  generate a DP query result based at least in part on the query request and generated DP mechanism.

Example A2. The DP node 12 of Example A1, wherein the processing circuitry 22 is further configured to determine a query sensitivity based at least in part on the query request, the DP mechanism being generated based at least in part on the query sensitivity.

Example A3. The DP node 12 of Example A2, wherein the processing circuitry 22 is further configured to:
  select a baseline DP mechanism based at least in part on the first input, second input and the query sensitivity;
  generate a noise parameter distribution for the baseline DP mechanism that meets the requirements of the first input and second input;
  select a noise parameter from the generated noise parameter distribution;
  generate a noise distribution based at least in part on the selected noise parameter;
  generate noise for the query based at least in part on the noise distribution; and
  determine the DP query result based at least in part on the query result and the generated noise for the query.

Example B1. A method implemented in a differential privacy (DP) node 12, the method comprising:
  receiving a query request;
  receiving a first input corresponding to a utility parameter for generating a DP mechanism and processing the query;
  receiving a second input corresponding to a privacy parameter for generating the DP mechanism and processing the query;
  generating the DP mechanism based at least in part on the first input, second input and query request; and
  generating a DP query result based at least in part on the query request and generated DP mechanism.

Example B2. The method of Example B1, further comprising determining a query sensitivity based at least in part on the query request, the DP mechanism being generated based at least in part on the query sensitivity.

Example B3. The method of Example B2, further comprising:
  selecting a baseline DP mechanism based at least in part on the first input, second input and the query sensitivity;

generating a noise parameter distribution for the baseline DP mechanism that meets the requirements of the first input and second input;
selecting a noise parameter from the generated noise parameter distribution;
generating a noise distribution based at least in part on the selected noise parameter;
generating noise for the query based at least in part on the noise distribution; and
determining the DP query result based at least in part on the query result and the generated noise for the query.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A differential privacy, DP, node, comprising:
processing circuitry configured to:
receive, from a data analyst, a query request;
receive a first input corresponding to a utility parameter, the utility parameter being associated with the data analyst and being a constraint on data privacy;
receive a second input corresponding to a privacy parameter, the privacy parameter being associated with a data owner;
select a baseline DP mechanism type from a plurality of available baseline DP mechanism types based at least on a query request type of the query request, the first input and the second input, the baseline DP mechanism type including at least a noise parameter;
generate a noise distribution based on the baseline DP mechanism type using a first value of the noise parameter; and
determine a DP query result based on applying the noise distribution to the query request applied on a data set.

2. The DP node of claim 1, wherein the processing circuitry is further configured to:
determine a noise parameter distribution for the noise parameter; and select the first value of the noise parameter from the noise parameter distribution, the first value of the noise parameter having a greater utility than the remaining plurality of values of the noise parameter distribution.

3. The DP node of claim 2, wherein the noise parameter distribution for the noise parameter meets requirements for the first and second inputs.

4. The DP node of claim 2, wherein the noise parameter distribution corresponds to a plurality of values of the noise parameter including the first value; and
the selection of the first value of the plurality of values of the noise parameter being based at least on the first value being greater than or equal to a query sensitivity associated with the query request.

5. The DP node of claim 1, wherein the DP query result corresponds to an aggregation of a query result to the query request and the noise distribution.

6. The DP node of claim 1, wherein the baseline DP mechanism type includes one of a Laplace mechanism type, exponential mechanism type and Gaussian mechanism type.

7. The DP node of claim 1, wherein the processing circuitry is further configured to determine a query sensitivity associated with the query request.

8. The DP node of claim 7, wherein the selection of the baseline DP mechanism type is based at least on the query sensitivity.

9. The DP node of claim 1, wherein the privacy parameter corresponds to a privacy constraint associated with a probability of a predefined loss of privacy.

10. The DP node of claim 1, wherein the utility parameter corresponds to an error constraint.

11. A method implemented by a differential privacy, DP, node, the method comprising:
receiving, from a data analyst, a query request;
receiving a first input corresponding to a utility parameter, the utility parameter being associated with the data analyst and being a constraint on data privacy;
receiving a second input corresponding to a privacy parameter, the privacy parameter being associated with a data owner;
selecting a baseline DP mechanism type from a plurality of available baseline DP mechanism types based at least on a query request type of the query request, the first input and the second input, the baseline DP mechanism type including at least a noise parameter;
generating a noise distribution based on the baseline DP mechanism type using a first value of the noise parameter; and
determining a DP query result based on applying the noise distribution to the query request applied on a data set.

12. The method of claim 11, further comprising:
determining a noise parameter distribution for the noise parameter; and
selecting the first value of the noise parameter from the noise parameter distribution, the first value of the noise parameter having a greater utility than the remaining plurality of values of the noise parameter distribution.

13. The method of claim 12, wherein the noise parameter distribution for the noise parameter meets requirements for the first and second inputs.

14. The method of claim 12, wherein the noise parameter distribution corresponds to a plurality of values of the noise parameter including the first value; and
the selection of the first value of the plurality of values of the noise parameter being based at least on the first value being greater than or equal to a query sensitivity associated with the query request.

15. The method of claim 11, wherein the DP query result corresponds to an aggregation of a query result to the query request and the noise distribution.

16. The method of claim 11, wherein the baseline DP mechanism type includes one of a Laplace mechanism type, exponential mechanism type and Gaussian mechanism type.

17. The method of claim 11, further comprising determining a query sensitivity associated with the query request.

18. The method of claim 17, wherein the selection of the baseline DP mechanism type is based at least on the query sensitivity.

19. The method of claim 11, wherein the privacy parameter corresponds to a privacy constraint associated with a probability of a predefined loss of privacy.

20. The method of claim 11, wherein the utility parameter corresponds to an error constraint.

* * * * *